United States Patent Office 3,501,396
Patented Mar. 17, 1970

3,501,396
HYDRODESULFURIZATION OF ASPHALTENE-CONTAINING BLACK OIL
John G. Gatsis, Des Plaines, Ill., assignor to Universal Oil Products Company, Des Plaines, Ill., a corporation of Delaware
No Drawing. Continuation-in-part of application Ser. No. 560,068, June 24, 1966. This application Apr. 14, 1969, Ser. No. 816,101
Int. Cl. C10g 23/02
U.S. Cl. 208—216                      3 Claims

ABSTRACT OF THE DISCLOSURE

Desulfurization of an asphaltene-containing black oil in admixture with 2.0% to about 30.0% by weight of water. A catalytic process in which an acidic catalyst containing 1.0% to 20.0% by weight of molybdenum and 0.2% to about 10.0% by weight of nickel is utilized. Selected desulfurizing conditions include a maximum catalyst temperature below about 800° F. and above the critical temperature of water.

RELATED APPLICATION

The present application is a continuation-in-part of my copending application, Ser. No. 560,068, filed June 24, 1966 and now abandoned, all the teachings of which copending application are incorporated herein by specific reference thereto.

APPLICABILITY OF INVENTION

The invention described herein is adaptable to a process for the desulfurization of petroleum crude oil. More specifically, the present invention is directed toward a process for effecting a reduction in the sulfur content of atmospheric tower bottoms products, vacuum tower bottoms products, crude oil residuum, topped crude oils, the crude oils extracted from tar sands, all of which are sometimes referred to as "black oils," and which contain a significant quantity of asphaltenic material.

Petroleum crude oils, particularly heavy oils extracted from tar sands, and topped or reduced crudes, contain high molecular weight sulfurous compounds in exceedingly large quantities. In addition, such crude, or black oils contain excessive quantities of nitrogenous compounds, high molecular weight organo-metallic complexes consisting principally of nickel and vanadium, and asphaltenic material. The latter is generally found to be complexed, or linked with sulfur and, to a certain extent, with the organo-metallic contaminants. The utilization of these highly contaminated black oils, as a source of more valuable liquid hydrocarbon products, is precluded unless the sulfur and asphaltene content is sharply reduced, and such a reduction is not easily achieved by preferred techniques involving fixed-bed catalytic processing.

The process encompassed by the present invention is particularly directed toward the catalytic desulfurization of petroleum crude oils while simultaneously converting about 50.0% of the asphaltenic material originally present. Specific examples of the crude, or black oils to which the present scheme is uniquely adaptable, include a sour Wyoming, full boiling range crude oil having a gravity of 23.2° API, and containing 2.8% by weight of sulfur and about 8.3% by weight of insoluble asphaltenes. A more difficult black oil is a vacum tower bottoms product having a gravity of 7.1° API, and containing 4.05% by weight of sulfur and 23.7% by weight of asphaltenes. A "topped" Middle-east Kuwait crude oil, having a gravity of 11.0° API, and containing 10.1% by weight of asphaltenes and 5.20% by weight of sulfur will, through the application of the present invention, experience a reduction of 50.0% of the asphaltenes and more than an 80% reduction in sulfur concentration. Such results have heretofore been considered virtually impossible to achieve on an economically feasible basis utilizing the generally preferred fixed-bed catalytic processing technique. The principal difficulty resides in the lack of sulfur stability of the catalytic composite employed, and arises primarily from the presence of asphaltenic material. This asphaltenic material comprises high molecular weight, non-distillable, oil-insoluble coke precursors, which can be complexed with nitrogen, metals and especially sulfur. Generally, the asphaltenic material is found to be colloidally dispersed within the crude oil, and, when subjected to heat, as in a vacuum distillation process, has the tendency to flocculate and polymerize whereby the conversion thereof to more valuable oil-insoluble products becomes extremely difficult. Thus, in the heavy bottoms from a crude oil vacuum distillation column the polymerized asphaltenes exist as solid material useful only as road asphalt, or as an extremely low grade fuel when cut with distillate hydrocarbons such as kerosene, light gas oil, etc.

The necessity for the removal of the foregoing contaminating influences is well known to those cognizant of petroleum refining processes and techniques. Heretofore, in the field of catalytic hydrorefining two principal approaches have been advanced: liquid-phase hydrogenation and vapor-phase hydrocracking. In the former type of process, the oil is passed upwardly in liquid phase, and in admixture with hydrogen, into a fixed-bed or slurry of sub-divided catalyst; although perhaps effective in removing at least a portion of the organo-metallic complexes, this type process is relatively ineffective with respect to oil-insoluble asphaltenes which are colloidally dispersed within the charge, with the consequence that the probability of effecting simultaneous contact between the catalyst particle and asphaltenic molecule is remote. Furthermore, since the hydrogenation reaction zone is generally maintained at an elevated temperature of at least about 500° C. (932° F.), the retention of unconverted asphaltenes, suspended in a free liquid phase oil for an extended period of time, will result in flocculation making conversion thereof substantially more difficult. The rate of diffusion of the oil-insoluble asphaltenes is substantially lower than of dissolved molecules of the same molecular size; for this reason, fixed-bed catalytic processes, in which the oil and hydrogen are passed through the catalyst, have been thought to be virtually precluded. The asphaltenes, being neither volatile nor dissolved in the crude, are unable to move to the catalytically active sites, the latter being obviously immovable. Furthermore, the efficiency of hydrogen to oil contact obtainable by bubbling hydrogen through an extensive liquid body is relatively low. On the other hand, vapor phase hydrocracking is carried out either with a fixed-bed or expanded-bed system at temperatures substantially above about 950° F.; while this technique obviates to a certain extent the drawbacks of liquid-phase hydrogenation, it is not suited to treating crude and heavy hydrocarbon fractions due to the non-volatility of the asphaltenes which favors a high production of coke and carbonaceous material, with the result that the catalytic composite succumbs to relatively rapid deactivation; this requires high capacity catalyst regeneration equipment in order to implement the process on a continuous basis.

Selective cracking of a full boiling range heavy hydrocarbon charge stock is not easily obtained, excessive amounts of light gases are produced at the expense of the more valuable normally liquid hydrocarbon product; minimum quantity of cracked gasoline production is unavoidable, and such a result is not desirable where the object is to maximize the production of middle and heavy distillates such as jet fuel, diesel oil, furnace oils, and gas oils.

These difficulties, attendant the conversion of asphaltenic material become more pronounced, and exhibit a more adverse effect, with respect to the desulfurization of crude oil. As hereinafter indicated in greater detail, the use of the present invention avoids these difficulties in a manner which provides economic feasibility to the desulfurization of crude oil.

OBJECTS AND EMBODIMENTS

The principal object of this invention is to provide an economically feasible catalytic crude oil desulfurization process in which the catalytic composite exhibits an unusually excellent degree of stability. The present process produces a crude oil product containing less than 20.0% by weight of the sulfur originally present in the crude oil, and simultaneously decreases the asphaltenic content by at least 50.0%.

Therefore, in a broad embodiment, the present invention encompasses a process for the desulfurization of petroleum crude oil which comprises admixing said crude oil with water and hydrogen, and reacting the resultant mixture in contact with a catalytic composite at desulfurizing conditions.

A more specific embodiment relates to a process for desulfurizing an asphaltene-containing black oil, which process comprises admixing said black oil with from 2.0% to about 30.0% by weight of water, reacting the resulting mixture with hydrogen in contact with a catalytic composite of from 0.2% to about 10.0% by weight of nickel and about 1.0% to about 20.0% by weight of molybdenum combined with an alumina-silica carrier material, and at desulfurizing conditions including a temperature from above the critical temperature of water to about 800° F., a pressure within the range of about 1,000 to about 2,500 p.s.i.g. and a liquid hourly space velocity from about 0.5 to about 2.0, and recovering said black oil reduced in sulfur content and containing a lesser quantity of asphaltenes.

SUMMARY OF INVENTION

The use of the term "desulfurizing conditions" is intended to encompass those operating conditions of temperature, pressure, liquid hourly space velocity and hydrogen concentration at which the sulfurous compounds are converted into hydrocarbons and hydrogen sulfide in the presence of water added to the charge stock in an amount of from about 2.0% to about 30.0% by weight. As will be readily noted by those skilled in the art of petroleum refining techniques the operating conditions which are hereinafter enumerated, are significantly less severe than those being currently comercially employed. The distinct economic advantages, over and above those inherent in unusual catalyst stability, will become immediately recognized.

Thus, the desulfurizing conditions are intended to include temperatures above the critical temperature of water, having an upper limit of about 800° F., and pressures in the range of from about 1,000 to about 2,500 p.s.i.g. Under the foregoing conditions, the crude oil is initially mixed with water in an amount of from 2.0% to about 30.0% by weight, and hydrogen in an amount less than about 10,000 s.c.f./bbl. The hydrogen is admixed with the crude oil by way of compressive recycle at the selected operating pressure, and is preferably in an amount of from about 3,000 to about 6,000 s.c.f./bbl. As hereinafter set forth, these hydrogen concentrations are significantly lower than would be expected according to current processing techniques. However, it must also be recognized that asphaltene-containing feed stocks, to which my invention is applicable, are very heat sensitive, and cannot be processed successfully without relatively high hydrogen partial pressures. Thus, while my invention permits operation at less than 10,000 s.c.f./bbl., the practical, safe lower limit is about 3,000 s.c.f./bbl.

The crude oil passes through the catalyst at a liquid hourly space velocity (defined as volumes of hydrocarbon charge per hour per volume of catalyst disposed in the reaction zone) of from about 0.5 to about 2.0. Although the present process may be conducted in a batchwise fashion, it readily lends itself to itself to continuous processing in an enclosed vessel through which the mixture of hydrocarbon charge stock, hydrogen and water is passed. When conducted as a continuous process, it is particularly preferred to introduce the mixture into the vessel in such a manner that the same passes through the vessel in downward flow. The internals of the vessel may be constructed in any suitable manner capable of providing the required intimate contact between the liquid charge stock and the gaseous mixture. In many instances it may be desirable to provide the reaction zone with a packed bed of inert material such as particles of granite, porcelain, berl saddles, sand, aluminum or other metal turnings, etc.

Since the reactions being effected in the desulfurizing reaction zone are primarily exothermic, the inlet temperature, or that to which the crude oil, water and hydrogen is heated, is less than the average temperature of the bed of catalyst particles disposed within the reaction zone. Thus, the mixture is heated to a level such that the maximum catalyst temperature is below about 800° F. In a specific example hereinafter set forth, the catalyst bed inlet temperature was 725° F. (385° C.) while the outlet temperature was 752° F. (400° C.). At these operating conditions, thermal cracking is inhibited and suppressed to the extent that the loss of liquid hydrocarbon product to gaseous waste material including carbon oxides and light paraffinic hydrocarbons is significantly decreased, as is the deposition of coke and other heavy hydrocarbonaceous material. As hereinbefore set forth, hydrogen is employed in admixture with the charge stock preferably in an amount of from about 3,000 to about 6,000 s.c.f./bbl. The hydrogen-containing gas stream, herein sometimes designated as "recycle hydrogen," since it is conveniently recycled externally of the hydrorefining zone, fulfills a number of various functions: it serves as a hydrogenating agent, a heat carrier, and particularly a means for stripping converted material from the catalytic composite, thereby creating still more catalytically active sites available for the incoming, unconverted hydrocarbon charge stock. Since some hydrogenation will be effected, there will be a net consumption of hydrogen; to supplement this, hydrogen is added to the system from any suitable external source.

The total product effluent from the reaction zone is passed into a suitable separator from which the normally liquid hydrocarbons are recovered, while the hydrogen-rich gaseous phase is returned to the reaction zone in admixture with additional external hydrogen required to replenish and compensate for the net hydrogen consumption which may range from about 200 to about 2,000 s.c.f./bbl. of liquid charge, the precise amount being dependent upon the characteristics of the charge stock. The recycle hydrogen-rich gas stream may be treated by any suitable means for the purpose of effecting the removal of ammonia and hydrogen sulfide resulting from the conversion of nitrogenous and sulfurous compounds. Furthermore, the normally liquid hydrocarbon product, removed from the separator, may be introduced into a stripping or fractionating column, or otherwise suitably treated for the purpose of removing dissolved normally gaseous hydrocarbons, including methane, ethane and propane, hydrogen sulfide and ammonia.

The catalytic composite disposed within the reaction zone can be characterized as a dual-function catalyst comprising a metallic component having hydrogenation activity and an acidic carrier material having cracking activity. An essential feature of the present invention resides in a catalyst which is "acidic" in nature, as opposed to a catalyst in which the acid function (required for hydrocracking, desulfurization and other hydrogen-consuming reactions or processes) is deliberately attenuated through the incorporation of an "acid poison." Well-known acid attenuating agents include the alkali metals, lithium, sodium, potassium, cesium and rubidium, and the alkaline-earth metals, beryllium, magnesium, calcium, strontium and barium. On the contrary, the catalyst required for successful black oil processing necessitates intentionally providing acid function through the incorporation, for example, of silica. In some instances, a halogen component may be used to impart the acidity to the catalyst; however, the addition of from 10.0% to about 40.0% silica—i.e. 12.0% by weight—is preferred.

Suitable metallic components, having hydrogenation activity, are thoroughly described in the art, and are those selected from the group generally consisting of the metals of Groups VI-B and VIII of the Periodic Table, as indicated in the Periodic Chart of the Elements, Fisher Scientific Company (1953). Thus, the catalytic composite may comprise one or more metallic components from the group of molybdenum, tungsten, chromium, iron, cobalt, nickel, platinum, palladium, iridium, osmium, rhodium, ruthenium, and mixtures thereof. The concentration of the catalytically active metallic component, or components, is primarily dependent upon the characteristics of the charge stock. For example, the metallic components of Group VI-B are preferably present in an amount within the range of about 1.0% to about 20.0% by weight, the iron-group metals in an amount within the range of about 0.2% to about 10.0% by weight, whereas the platinum-group metals are preferably present in an amount within the range of about 0.1% to about 5.0% by weight, all of which are calculated as if the components existed within the finished catalytic composite as the elemental metal. One particular catalytic composite is especially preferred for black oil desulfurization in the presence of water. Significantly increased stability and activity are realized through the use of 1.0% to about 20.0% by weight of molybdenum, 0.2% to about 10.0% by weight of nickel and an alumina-silica carried material, the silica content being about 12.0% by weight.

The refractory inorganic oxide carrier material may comprise alumina, silica, zirconia, magnesia, titania, boria, strontia, hafnia, and mixtures of two or more including silica-alumina, silica-zirconia, silica-magnesia, silica-titania, alumina-zirconia, alumina-magnesia, alumina-titania, magnesia-zirconia, titania-zirconia magnesa-titania, silica-alumina-zirconia, silica-alumina-magnesia, silica-alumina-titania, silica-magnesia-zirconia, silica-alumina-boria, etc. It is preferred to utilize a carrier material containing at least a portion of silica, and preferably a composite of alumina and silica with alumina being in the greater proportion.

The following example is given to illustrate the present invention, and to indicate the unexpected effectiveness thereof in desulfurizing a petroleum crude oil fraction. It is not intended to limit the present invention to the particular method employed, the concentrations of material, the particular charge stock and/or the specific conditions of operation utilized in presenting this example.

EXAMPLE

The catalyst employed in this example contained 2.0% by weight of nickel and 16.0% by weight of molybdenum (as if existing as the elements thereof), composited with a carrier material of 88.0% alumina and 12.0% silica. The catalyst was disposed in the reaction zone in an amount of 150 cc., such that a crude oil charge rate of 150 ml./hr. was equivalent to a liquid hourly space velocity of 1.0. The petroleum crude oil was a, "topped" Middle-east, Kuwait crude containing 5.2% by weight of sulfur, and having a gravity of 11.0° API at 60° F. An analysis of the charge stock indicated that 10.0% by weight consisted of oil-insoluble asphaltenic material.

Heretofore, a commercially acceptable process for desulfurizing this crude oil, in order that the same be enhanced in value, would require temperatures of at least about 932° F. (500° C.), pressures as high as 3,000 p.s.i.g., and hydrogen concentrations greater than 10,000 s.c.f./bbl. Under these conditions of temperature and pressure, the catalytic composite will succumb rapidly to deactivation as a result of its sulfur instability stemming from the inclusion of asphaltenes in the black oil. Notwithstanding the relatively high hydrogen throughput, and in many proposed installations of crude desulfurization units, the hydrogen rate is recommended as high as 10,000 s.c.f./bbl., the catalytic composite "loses" its active sites and it becomes necessary to resort to frequent, involved regeneration techniques.

In accordance with the concept of the present invention, wherein water is added to the crude oil in an amount of 2.0% to 30.0% by weight, commercial economical operability is achieved at pressures of about 2,500 p.s.i.g. and lower, at temperatures of 800° F. and lower, and, more surprisingly, at hydrogen rates below 10,000 s.c.f./bbl. As hereinafter indicated, sulfur stability was achieved with the hydrogen rate as low as 5,000 s.c.f./bbl. The utilization of water in these comparatively excessive amounts appears to improve the hydrogen diffusion rate through the liquid phase on the catalyst, being increased as a result of the reduced viscosity and surface tension characteristics of the liquid phase. Thus, the difficulty of supplying hydrogen to the active sites of the catalyst is greatly reduced, catalytic activity is substantially increased and a greater degree of catalyst stability is experienced. Additionally, as will be readily recognized, other advantages reside in the economic considerations attached to lower operational severity as well as decreased hydrogen circulation.

The "topped" Kuwait crude above described was admixed with 15.0% by weight of water and circulating hydrogen in an amount of 5,000 s.c.f./bbl. of crude oil. The crude oil charge rate was 150 ml./hr., or a liquid hourly space velocity of 1.0. Temperature control was such that the catalyst bed inlet temperature was 725° F. (385° C.), resulting in a catalyst bed outlet temperature of 752° F. (400° C.). The operating pressure was maintained at 1,500 p.s.i.g. by compressive hydrogen recycle.

A series of test periods was performed at these conditions, each test period being of eight-hours duration. Analyses were made of the hydrocarbon liquid product, following the removal of a hydrogen-rich gaseous phase and separation of water, for a composite sample from each test period. Over the initial 34 test periods, or 272 hours, the liquid product averaged a gravity of about 17.6° API at 60° F., 5.1% by weight of non-distillable asphaltenes, and about 1.52% by weight of sulfur (71.7% removal). Three of the later periods are shown in the following Table I.

TABLE I

|  | Period No. | | |
| --- | --- | --- | --- |
|  | 28 | 31 | 34 |
| Gravity, ° API at 60° F | 17.4 | 17.4 | 17.4 |
| Wt. percent asphaltenes | 5.2 | 5.3 | 4.9 |
| Sulfur, wt. percent | 1.49 | 1.54 | 1.54 |

Over the next three periods, the crude oil charge rate was changed to lower the space velocity to 0.67 (100 ml./hr.). Representative test periods following this single change in operating conditions, are shown in Table II:

TABLE II

|  | Period No. | | |
| --- | --- | --- | --- |
|  | 37 | 40 | 43 |
| Gravity, °API at 60° F | 18.7 | 18.6 | 18.9 |
| Wt. percent asphaltenes | 4.28 | 4.20 | 4.17 |
| Sulfur, wt. percent | 1.18 | 1.21 | 1.15 |

At the completion of period 43, the catalyst had been in continuous operation for 344 hours, and the sulfur removal was approximately 77.9%. Of further interest is the fact that the oil-insoluble asphaltenes had been reduced by more than 50.0%.

For the next three periods, the operating pressure was increased to 2,000 p.s.i.g., all other conditions remaining the same. Again, representative test periods follow in Table III.

TABLE III

|  | Period Number | | |
| --- | --- | --- | --- |
|  | 46 | 52 | 55 |
| Gravity, °API at 60° F | 19.6 |  | 19.9 |
| Wt. percent asphaltenes | 3.67 | 3.22 | 3.27 |
| Sulfur, wt. percent | 0.92 | 0.93 | 0.93 |

After 55 periods, or 440 hours of operation, the catalyst continued to remove more than 80.0% of the sulfur, 67.5% of the oil-insoluble asphaltenes, and was producing a liquid hydrocarbon effluent having a gravity of almost 20.0° API at 60° F.

The foregoing specification and example clearly set forth the means by which the present crude oil desulfurization process is effected, and indicates the benefits afforded the utilization thereof. Product quality is such that the 20.0° API gravity material will find immediate use as fuel in many areas, notable the Far-east and in Europe. The product can be selectively fractionated for further subsequent processing; it will be recognizable also as an excellent charge stock for a coking unit.

I claim as my invention:

1. A process for desulfurizing an asphaltene-containing black oil which comprises admixing said black oil with from 2.0% to about 30.0% by weight of water, reacting the resulting mixture with hydrogen in contact with a catalytic composite of from 0.2% to about 10.0% by weight of nickel and about 1.0% to about 20.0% by weight of molybdenum combined with an alumina-silica carrier material at a desulfurizing temperature in the range of from above the critical temperature of water to about 800° F., a pressure within the range of about 1,000 to about 2,500 p.s.i.g. and a liquid hourly space velocity from about 0.5 to about 2.0, and recovering said black oil reduced in sulfur content and containing a lesser quantity of asphaltenes.

2. The process of claim 1 further characterized in that said hydrogen is present in an amount less than about 10,000 s.c.f./bbl.

3. The process of claim 1 further characterized in that said carrier material contains about 12.0% by weight of silica.

References Cited

UNITED STATES PATENTS

| 2,901,415 | 8/1959 | Hemminger et al. | 208—216 |
| 3,016,350 | 1/1962 | Butler et al. | 208—216 |
| 3,173,853 | 3/1965 | Peralta | 208—216 |
| 3,453,206 | 7/1969 | Gatsis | 208—210 |

DELBERT E. GANTZ, Primary Examiner

G. J. CRASANAKIS, Assistant Examiner